US012763976B2

(12) United States Patent
Khan et al.

(10) Patent No.: US 12,763,976 B2
(45) Date of Patent: Oct. 13, 2026

(54) SYSTEM AND METHOD FOR USING A SUBSCRIBER IDENTITY MODULE AS A PSEUDONYM CERTIFICATE

(71) Applicant: THALES DIS FRANCE SAS, Meudon (FR)

(72) Inventors: Muhammad Ijaz Khan, Espoo (FI); Alsasian Atmopawiro, Singapore (SG); Alain Gattone, Auriol (FR); Jean-Philippe Millard, Cabries (FR)

(73) Assignee: THALES DIS FRANCE SAS, Meudon (FR)

( * ) Notice: Subject to any disclaimer, the term of this patent is extended or adjusted under 35 U.S.C. 154(b) by 13 days.

(21) Appl. No.: 18/880,300

(22) PCT Filed: Jul. 7, 2023

(86) PCT No.: PCT/EP2023/068933

§ 371 (c)(1),
(2) Date: Dec. 31, 2024

(87) PCT Pub. No.: WO2024/008961

PCT Pub. Date: Jan. 11, 2024

(65) Prior Publication Data

US 2025/0392480 A1 Dec. 25, 2025

(30) Foreign Application Priority Data

Jul. 7, 2022 (EP) .................................... 22306017

(51) Int. Cl.

| | |
|---|---|
| ***H04L 9/32*** | (2006.01) |
| ***H04L 9/08*** | (2006.01) |
| ***H04W 12/037*** | (2021.01) |
| ***H04W 12/40*** | (2021.01) |

(52) U.S. Cl.

CPC .......... *H04L 9/3268* (2013.01); *H04L 9/0894* (2013.01); *H04L 9/3265* (2013.01);
(Continued)

(58) Field of Classification Search

CPC ... H04L 9/3268; H04L 9/0894; H04L 9/3265; H04L 9/3271; H04L 9/3297;
(Continued)

(56) References Cited

U.S. PATENT DOCUMENTS 10,158,491 B2 * 12/2018 Bonsignore .......... G06Q 20/085
10,277,406 B1 4/2019 Veladanda et al.
(Continued)

FOREIGN PATENT DOCUMENTS

| | | | | | |
|---|---|---|---|---|---|
| CA | 2997585 | A1 * | 3/2017 | ........... | G06F 21/602 |
| EP | 3040924 | A1 * | 7/2016 | ......... | G06Q 20/3229 |
| WO | WO2018232111 | A1 | 12/2018 | | |

OTHER PUBLICATIONS

International Search Report (PCT/ISA/210) and Written Opinion (PCT/ISA/237) mailed on Jul. 21, 2023, by the European Patent Office as the International Searching Authority for current International Application No. PCT/EP2023/068933—[9 pages].

*Primary Examiner* — Khanh Q Dinh

(57) ABSTRACT

A system or method for using a subscriber identity module (SIM) as a pseudonym certificate authority (PCA) to anonymize and mitigate the tracking of a device having the SIM. The system or method can include one or more processors that can validate a device identity presented by the device where the SIM serves as a Registration Authority and that can issue a new certificate in response to a certificate sign request (CSR) submitted by the device where the SIM serves as a Certificate Authority (CA). In some embodiments, the SIM is an applet stored within the device. In some embodiments, the SIM acts as the PCA to generate short-live end-entity certificates dedicated to sign broadcast messages. Other embodiments are disclosed.

10 Claims, 7 Drawing Sheets

SIM as PCA at Device Identity Issuance

100

(52) U.S. Cl.
CPC .......... *H04L 9/3271* (2013.01); *H04L 9/3297* (2013.01); *H04W 12/037* (2021.01); *H04W 12/40* (2021.01)

(58) Field of Classification Search
CPC . H04L 9/0891; H04L 9/3247; H04L 2209/42; H04L 2209/80; H04L 9/40; H04L 67/12; H04W 12/037; H04W 12/40; H04W 4/60; H04W 4/70; H04W 12/069; H04W 12/041
USPC .......................................... 709/220, 224–229
See application file for complete search history.

(56) References Cited

U.S. PATENT DOCUMENTS 10,430,786 B1 * 10/2019 Camacho ............ H04L 63/0823
11,109,194 B1 * 8/2021 Pinheiro ............... H04W 4/029
2006/0039564 A1 2/2006 Rao
2007/0106897 A1 * 5/2007 Kulakowski ............ H04L 9/083 713/168
2008/0009265 A1 * 1/2008 Fernandez-Alonso ...................... H04W 12/069 455/411
2016/0164847 A1 * 6/2016 Heer ................... H04M 3/5191 713/168
2016/0195356 A1 * 7/2016 Roady ........................ F41B 5/14 124/87
2017/0111792 A1 * 4/2017 Correia Fernandes ...................... H04W 76/12
2017/0244697 A1 * 8/2017 Caceres ................ H04L 9/3297
2019/0068381 A1 * 2/2019 Takemori .............. H04L 9/3268
2019/0123915 A1 4/2019 Simplicio, Jr. et al.
2023/0319573 A1 * 10/2023 Li ........................ H04W 12/041 726/9
2025/0008314 A1 * 1/2025 Lu ........................ H04W 12/069
2025/0009314 A1 * 1/2025 Gulsun .................. A61B 6/032

* cited by examiner

SIM as PCA at Device Identity Issuance

100

400

SIM as PCA: Certificate Sign Request (CSR) Submission

600

700

SYSTEM AND METHOD FOR USING A SUBSCRIBER IDENTITY MODULE AS A PSEUDONYM CERTIFICATE

CROSS-REFERENCE TO RELATED APPLICATIONS

Not applicable.

TECHNICAL FIELD

The present disclosure generally relates to authentication of communication devices. More particularly, but not exclusively, the present disclosure relates to authentication of communication devices using a subscriber identity module as a PCA.

BACKGROUND

Traditional PKI models for securing messages between ever-increasing multitudes of devices fail to be scalable and secure in terms of privacy. Although point-to-point encryption can provide authentication and digital certificates can provide a safe environment for IoT devices to function, there is still opportunity for data leakage and hacking with existing PKI schemes. PKI is a core component of TLS (Transport Layer Security), and implementing it into IoT brings much-needed standardization and security, but more can be done to make a PKI based system scalable and secure.

Between client and server devices, PKI systems use a TLS handshake, where both client and server exchange their certificates in the clear. In other words, the exchange done during a traditional TLS handshake makes it possible to track the device activity each time a connection is established. Furthermore, trying to accommodate all the devices in communication with each other between vehicles, machines, and other devices would put an enormous strain on a PKI infrastructure system if all devices or a significant portion of the devices in an IoT or other environment were to use traditional PKI models.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

SUMMARY

In some embodiments, a method of using a subscriber identity module (SIM) as a pseudonym certificate authority (PCA) to anonymize and mitigate the tracking of a device having the SIM can include one or more processors and memory coupled to the one or more processor. The memory can include computer instructions which when executed by the one or more processors causes the one or more processors to perform the operations of validating a device identity presented by the device where the SIM serves as a Registration Authority and issuing a new certificate in response to a certificate sign request (CSR) submitted by the device where the SIM serves as a Certificate Authority (CA).

In some embodiments, the SIM is an applet or virtual SIM stored within the device. In some embodiments, the SIM is a physical card.

In some embodiments, the SIM is provisioned securely with a copy of a device root CA certificate to validate a certificate chain of the device identity and a communication CA certificate to issue a new communication end-entity device certificate stored in the device or in the SIM. In some embodiments, the SIM is an applet, the communication CA certificate has a public key, and the device root CA certificate has a private key, where the private key is stored in the applet in a secure manner as part of the device provisioning. In some embodiments, the device is provisioned with the device root CA certificate and the communication CA certificate at a factory or pushed remotely and securely through a dedicated remote administration server.

In some embodiments the one or more processors further perform device authentication by performing the operations of retrieving by the device a current time from a trusted time source, submitting by the device the new communication end-entity device certificate and the current time to the SIM, validating by the SIM a chain using the copy of the device root CA certificate, and validating by the SIM the dates related to the copy of the device root CA certificate using the current time. The method can further perform device authentication by generating by the SIM a secure random challenge and storing it in the SIM with the current time, encrypting by the SIM the secure random challenge using a public key for the communication CA certificate forming an encrypted challenge, and sending by the SIM to the device the encrypted challenge. The method further performs device authentication by decrypting by the device the encrypted challenge using a private key for the device root CA certificate providing an decrypted challenge and storing by the device the decrypted challenge.

In some embodiments, the one or more processors further perform the certificate sign request (CSR) by performing the operations of generating by the device a public/private key pair which will be associated to the communication CA certificate, building by the device the CSR including a challenge password, generating a private key by the device to sign the CSR, and submitting by the device the CSR to the SIM. The method further performs the CSR by the SIM by retrieving the password and the time, checking the challenge password, verifying a CSR signature using the public key, checking rules and generating validity dates from a current time, and issuing by the SIM a new certificate if all rules are checked and passed.

In some embodiments, the SIM acts as the PCA to generate short-live end-entity certificates dedicated to sign broadcast messages. In some embodiments, the device regularly obtains new communication certificates to prevent tracking.

In some embodiments, the method separates a server portion responsible for transport serving as a technical frontend from a server portion responsible for data treatment serving as a business logic backend and wherein the device as a client remains unknown to the technical frontend while still knowing that the device is a valid client.

In some embodiments, the method provides authentication between IoT devices in a scalable manner using PKI infrastructure using short-live certificates.

In some embodiments, a system of authenticating a communication device by issuance of a certificate includes a subscriber identity module (SIM) in a form of an applet securely linked to the device and used as a pseudonym certificate authority (PCA). In some embodiments, the SIM is configured to validate a device identity presented by the device, wherein the SIM serves as a Registration Authority and issue a new certificate in response to a certificate sign request (CSR) submitted by the communication device, wherein the SIM serves as a Certificate Authority (CA).

In some embodiments, the SIM is provisioned securely with a copy of a device root CA certificate to validate a certificate chain of the device identity and a communication CA certificate to issue a new communication end-entity device certificate stored in the device or in the SIM. In some embodiments, the system includes one or more processors of the SIM and communication device that further perform device authentication by performing the operations of at the communications device of retrieving a current time from a trusted time source, and submitting the new communication end-entity device certificate and the current time to the SIM. The authentication can further include performing by the SIM the operations of validating a chain using the copy of the device root CA certificate, validating the dates related to the copy of the device root CA certificate using the current time, generating a secure random challenge and storing it in the SIM with the current time, encrypting the secure random challenge using a public key for the communication CA certificate forming an encrypted challenge, and sending the device the encrypted challenge. The authentication can further include performing by the device the operations of decrypting the encrypted challenge using a private key for the device root CA certificate providing an decrypted challenge, and storing the decrypted challenge at the device.

In some embodiments, the one or more processors can further perform the certificate sign request (CSR) by performing the operations at the communication device of generating a public/private key pair which will be associated to the communication CA certificate, building the CSR including a challenge password, generating a private key to sign the CSR and submitting the CSR to the SIM. The CSR further includes the operations by the SIM of retrieving the password and the time, checking the challenge password, verifying a CSR signature using the public key, checking rules and generating validity dates from a current time, and issuing by the SIM a new certificate if all rules are checked and passed, where the new certificate can be a short-live certificate.

In some embodiments, the system separates a server portion responsible for transport serving as a technical frontend from a server portion responsible for data treatment serving as a business logic backend and wherein the communication device as a client remains unknown to the technical frontend while still knowing that the communication device is a valid client.

In some embodiments, a system of authenticating a device by issuance of a certificate can include a subscriber identity module (SIM) in a form of an applet securely linked to the device and used as a pseudonym certificate authority (PCA), a copy of a device root CA certificate used to validate a certificate chain of the device identity provisioned securely in the SIM, and a communication CA certificate used to issue a new communication end-entity device certificate stored in the device or in the SIM. In some embodiments, the SIM is configured for validating a device identity presented by the communication device, where the SIM serves as a Registration Authority by receiving the new communication end-entity device certificate and the current time to the SIM, validating a chain using the copy of the device root CA certificate, validating the dates related to the copy of the device root CA certificate using the current time, generating a secure random challenge and storing it in the SIM with the current time, encrypting the secure random challenge using a public key for the communication CA certificate forming an encrypted challenge, and sending to the device the encrypted challenge for decryption and storage by the device of a decrypted challenge. In some embodiments, the SIM further issues a new certificate in response to a certificate sign request (CSR) submitted by the device, where the SIM serves as a Certificate Authority (CA).

In some embodiments, the system performs in response to the CSR, the operations of at the device of generating a public/private key pair which will be associated to the communication CA certificate, building the CSR including a challenge password, generating a private key to sign the CSR, and submitting the CSR to the SIM. In some embodiments, the SIM retrieves the password and the time, checks the challenge password, verifies a CSR signature using the public key and checks rules and generates validity dates from a current time. In some embodiments, the SIM further issues and a new certificate if all rules are checked and passed.

In some embodiments, the system separates a server portion responsible for transport serving as a technical frontend from a server portion responsible for data treatment serving as a business logic backend and wherein the device as a client remains unknown to the technical frontend while still knowing that the device is a valid client.

In some embodiments, the system issues a group of certificates with appropriate start/end dates in order to optimize access between device and SIM.

BRIEF DESCRIPTION OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which.

DETAILED DESCRIPTION

Figure 1:
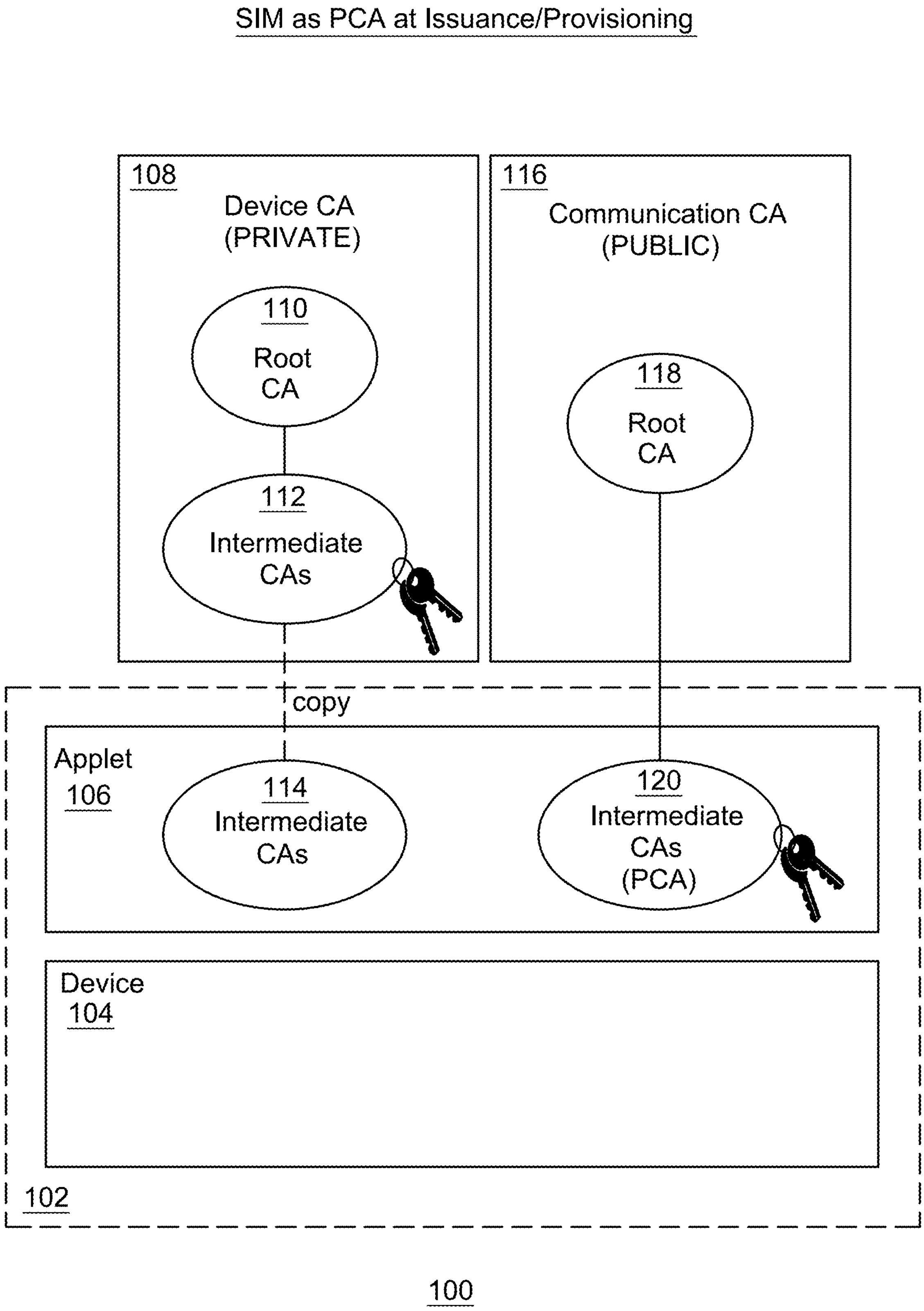
FIG. 1 illustrates a system where a SIM serves as a PCA at issuance or provisioning at a factory or by a dedicated remote administrative server in accordance with the embodiments.

In the following description, certain specific details are set forth in order to provide a thorough understanding of various disclosed embodiments. However, one skilled in the relevant art will recognize that embodiments may be practiced without one or more of these specific details, or with other methods, components, materials, etc. Also in these instances, well-known structures may be omitted or shown and described in reduced detail to avoid unnecessarily obscuring descriptions of the embodiments.

These embodiments concern communication between IoT devices such as the one defined by V2X (vehicle-to-everything). V2X is a vehicular communication system where broadcast messages are exchanged between vehicles and other entities. For obvious reasons, these messages should be secured. Usually a PKI model is used here for example to validate the signature of each broadcast message. The embodiments herein propose a way to deploy this PKI infrastructure in such ecosystem in a scalable way that would not overburden the infrastructure. The embodiments are not limited to V2X systems which are used as examples only. Any embodiments where short-live certificates should be issued can take advantage of the embodiments. For example, another direct application of this embodiments is the anonymization of client connections to technical platforms such as public IoT Hub (Cf AWS IoT Core).

In the context described above where a PKI model is used to secure messages between IoT devices, there is a strong need for privacy. In order to avoid IoT device tracking (or vehicle tracking), device certificates used to sign broadcast messages or to connect to a backend server should be regularly updated causing a lot of pressure on dedicated certificate authorities which should provide regularly new certificates for the number of devices growing continuously. The “end-entity” certificates used in this context in the various embodiments herein are short-live and should be renewed frequently.

The problem is solved by using the SIM as a “Pseudonym Certificate Authority” providing a scalable solution no matter the number of involved devices.

The embodiments herein assume that an IoT device is able to provide its device identity. The means to generate and/or manage this device identity can be done in numerous ways. In the context of this disclosure for example, a SIM through a dedicated applet can have two roles:

In a first role as a Registration Authority (RA), the SIM (through the applet) will first validate the device identity presented by the device. (Device authentication).

In a second role as a Certificate Authority (CA), the SIM will be able to issue new certificates from certificate sign requests (CSRs) submitted by the device.

In order to play these roles, the SIM (applet) should be provisioned properly and securely with following information:

The root CA certificate (usually private) called in this document “Device Root CA certificate” is used to validate the device identity certificate chain.

The root CA certificate or intermediate CA certificate (usually public) called in this document “Communication CA certificate” is used to issue new communication “end-entity” device certificates. Regarding this CA certificate, private key should be also installed in the applet in a secure way. The same intermediate CA certificate could be installed in several SIMs.

FIG. 1 illustrates a system 100 at factory issuance or provisioning or after remote administration that can be achieved with over-the-air (OTA) programming of the SIM and/or device. More particularly, a SIM as applet 106 serves as the device certificate authority or CA 108 (usually private) by being provisioned with a root CA 110 or intermediate CA 112, which is copied into the applet 106 as intermediate CA 114. The root CA certificate 118 (usually public) used for issuing new communication “end entity” device certificates for the device 104 (see 500 in FIG. 5) is also used to provide the intermediate CA 120 in the Applet 106. Again, these certificates could be installed in the factory or pushed remotely and securely through a dedicated remote administration server. Note that the device 104 is a communication device and that the device 104 and applet 106 can both be part of another device 102 such as a vehicle, IoT device, or almost any other device that can have a communication device 104 and applet 106.

Figure 2:
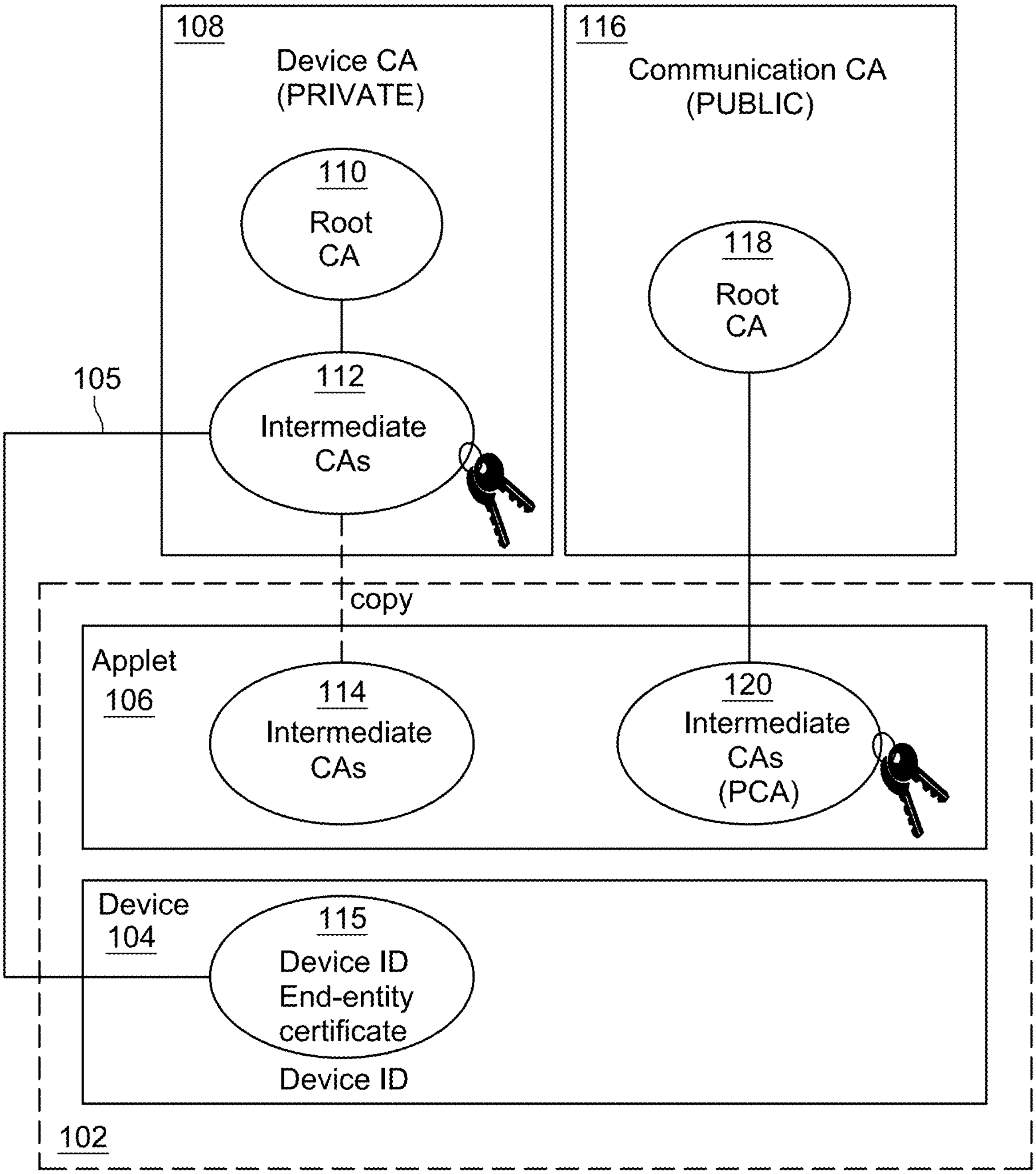
FIG. 2 illustrates the system of FIG. 1 where the SIM serves as the PCA at device identity issuance in accordance with the embodiments.

FIG. 2 illustrates the system 100 where the SIM or Applet 106 serves as PCA at the point that the device identity is issued for the device 104. FIG. 2 shows the system 100 similar to the system 100 shown in FIG. 1, but further illustrating that the device ID or device ID end-entity certificate 115 has been issued to the device 104 in a trusted manner as represented by step or process 105. The system 100 in both FIG. 1 and FIG. 2 represent preliminary or initial environments that enable some of the embodiments herein. FIG. 1 reflects the provisioning of the Applet 106 and FIG. 2 reflects the provisioning of the Device Identity or Device Identity Issuance to the device 104, where the process begins with Device authentication.

Figure 3:
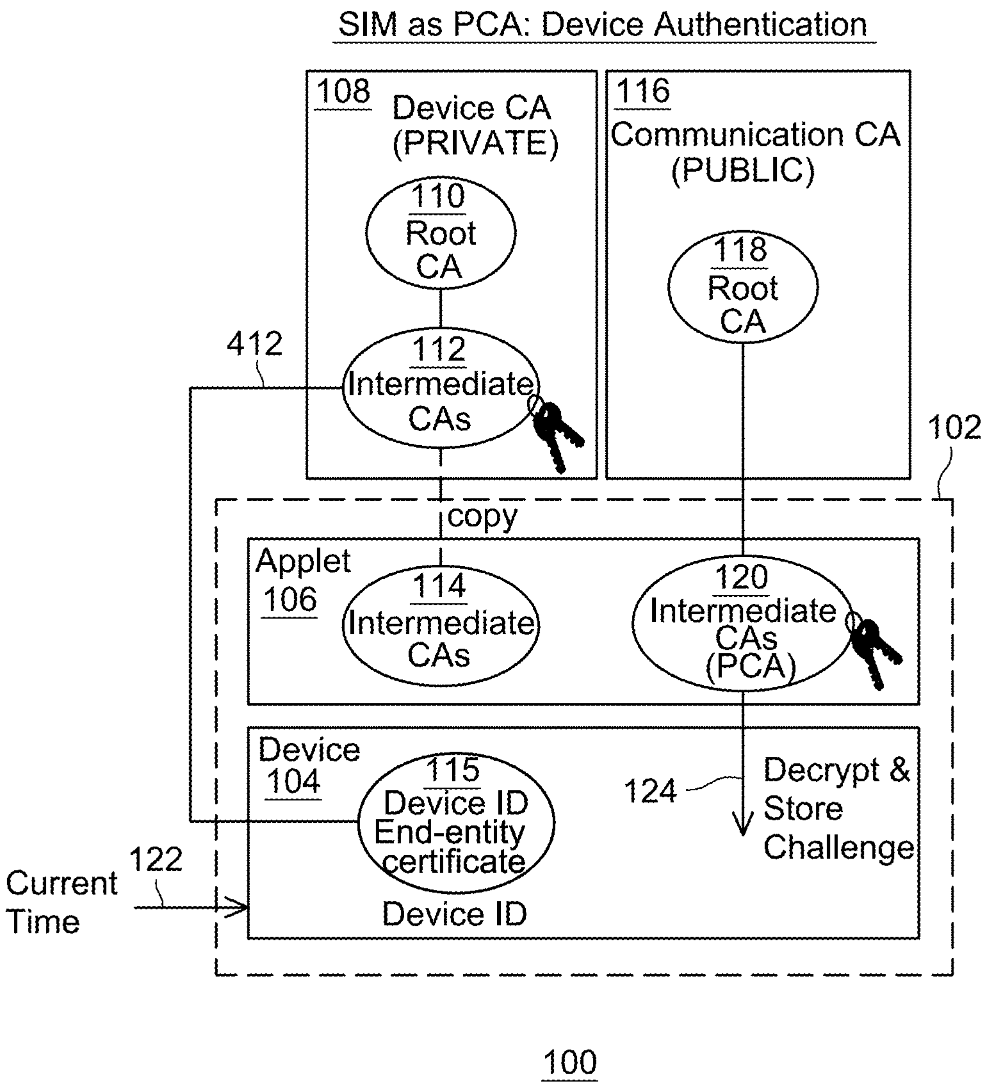
FIG. 3 illustrates the system of FIG. 2 where the SIM serves as the PCA during device authentication in accordance with the embodiments.
Figure 4:
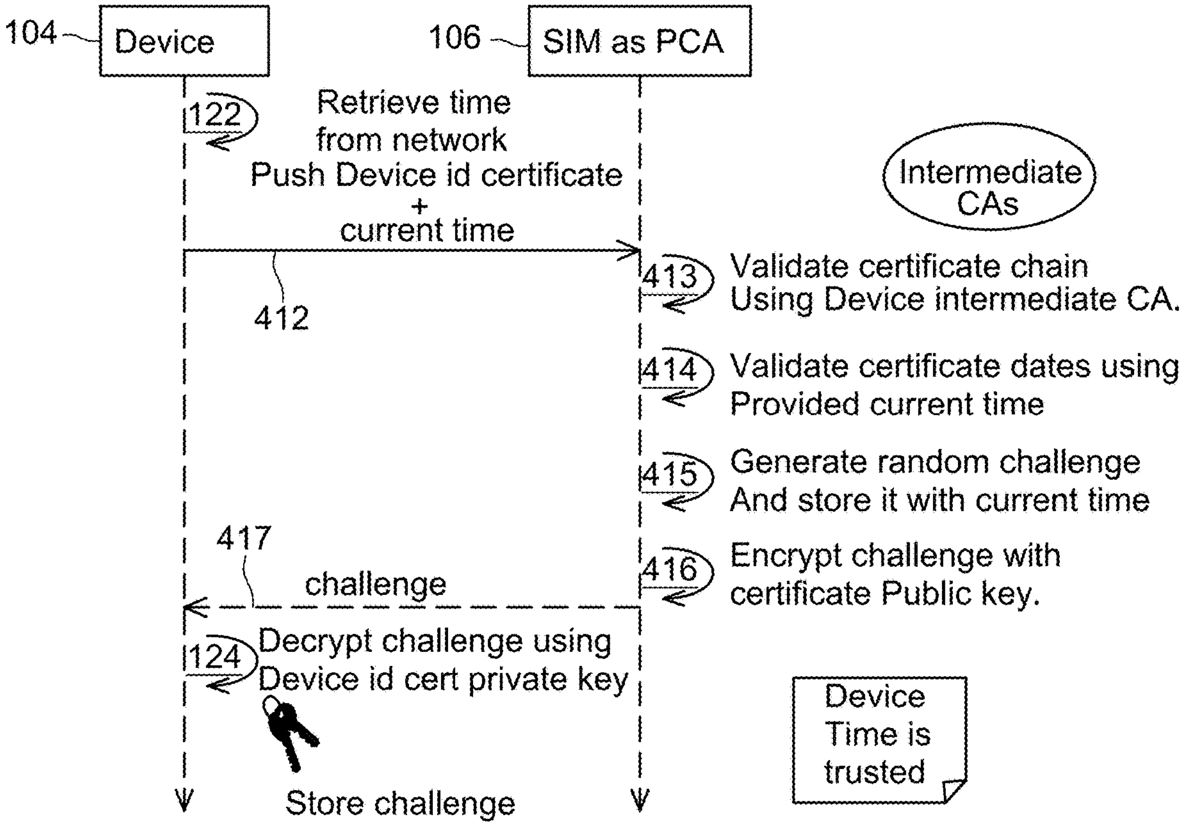
FIG. 4 illustrates a timing diagram between a device and a SIM that serves as the PCA during device authentication, in accordance with the embodiments.

More particularly, the methods and systems in accordance with the embodiments are illustrated beginning with the system 100 of FIG. 3 and method or timeline 400 of FIG. 4 where the SIM serves as the PCA during device authentication for the device 104.

The method 400 begins by having the Device 104 retrieving a current time (from network or other trusted time source) at 122. This time is trusted.

Next, the device 104 pushes or submits its device identity certificate 115 obtained previously (see FIG. 2) and the current time 122 at 412.

At 413, the SIM (applet 106) validates the chain using “Device intermediate CA certificate” 114. At 414, the SIM or applet 106 further validates the dates related to this certificate using current time. At 415, the SIM or applet 106 generates a secure random challenge and stores it with the current time. At 416, the SIM or applet 106 can then encrypt the random challenge with the “Device identity certificate” public key 120 and returns the challenge to the device 104 at 417. The device can then decrypt the encrypted random challenge at 124 using the Device ID certificate private key (115) and store the random challenge.

The challenge password is required to authenticate the device which requests “short-live” certificates. This authentication is mandatory.

Figure 5:
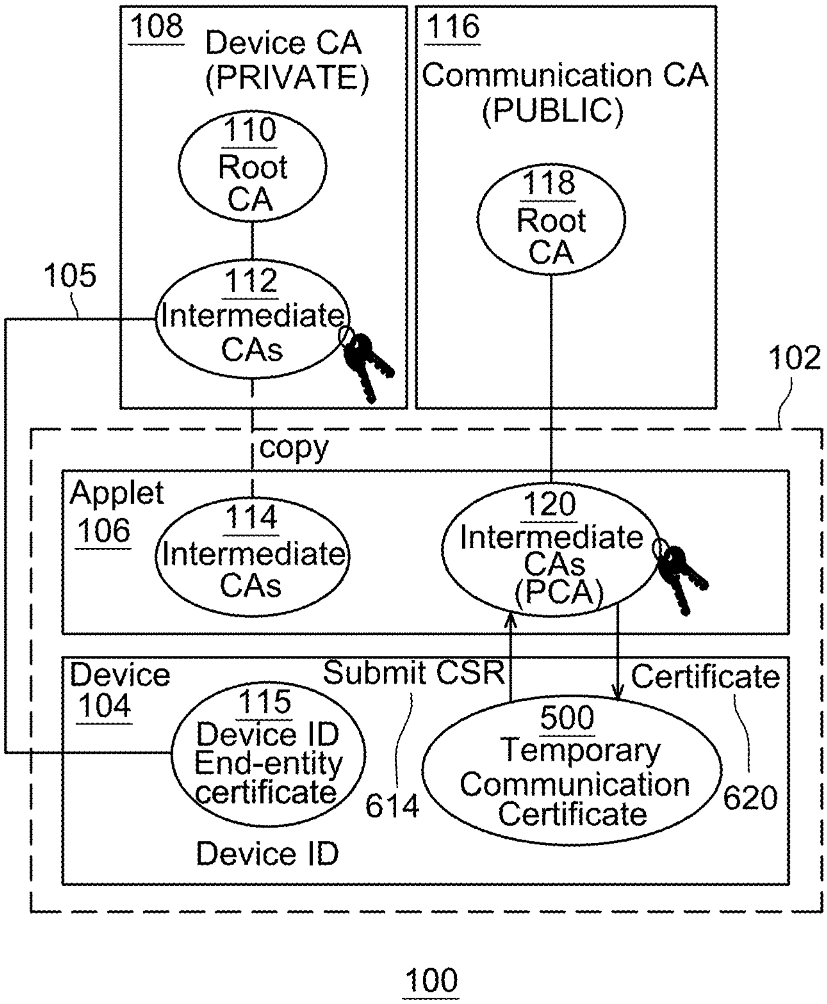
FIG. 5 illustrates the system of FIG. 3 where the SIM serves as the PCA during a CSR submission by the device in accordance with the embodiments.
Figure 6:
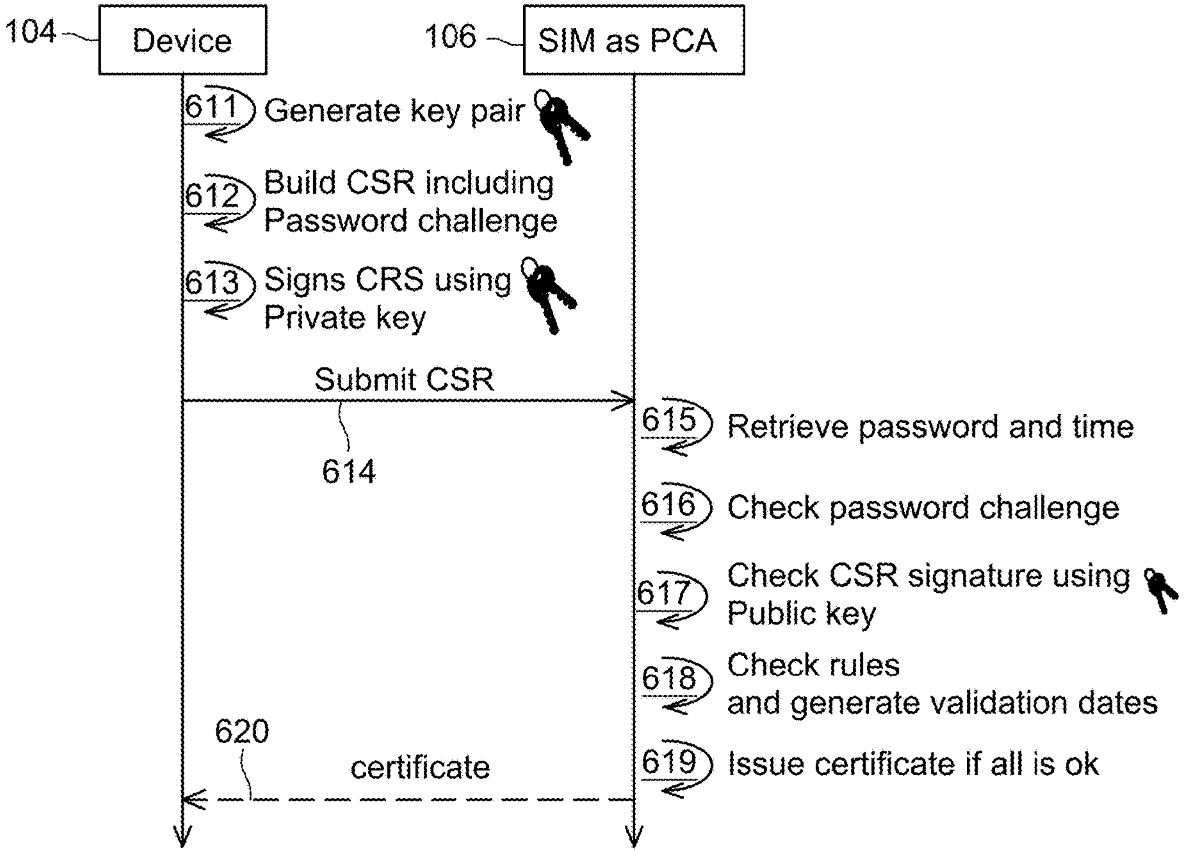
FIG. 6 illustrates a timing diagram between a device and a SIM that serves as the PCA during the CSR submission by the device in accordance with the embodiments.

FIGS. 5 and 6 illustrate system 100 and timeline or method 600 further depicting the steps of CSR submission and certificate issuance using the SIM as the PCA.

The method 600 begins with device 104 generating a key pair (public/private) at 611. This key pair will be associated to the device communication certificate 500 which in most embodiments is a short-live or temporary communication certificate.

At 612, the device 104 builds the CSR including the challenge password. At 613, the device 104 uses the generated private key to sign the CSR request. Then, the device 104 submits the CSR request at 614 to SIM or Applet 106.

At 615, the SIM or Applet 106 retrieves password and time and further checks the challenge password at 616. Next, SIM or Applet 106 can verify the CSR signature using the provided public key at 617. At 618, the SIM or Applet 106 checks the rules (which can be part of the applet configuration) and generates validity dates from current time. If the SIM or Applet 106 passes all the rules or checks, then the SIM or Applet 106 issues the new communication certificates 500 at 620.

In this regard, the SIM or applet 106 acts as a PCA (Pseudonym Certificate Authority) generating short-live end-entity certificates dedicated to signing broadcast messages. Since "Communication CA" 116 is public, other entities are able to validate "Device Communication" certificate chain(s) and verify the signature of received messages.

This operation can be executed regularly by the device 104 (or 102) to obtain new communication certificates and thus prevent tracking activities from a malicious attacker. Thus, the embodiments solves the technical problem of providing privacy in a scalable way that does not overburden PKI infrastructure.

In some various embodiments, a system or method could issue a group of certificates with appropriate start/end dates in order to optimize access between device and SIM.

Some of the embodiments herein can be extended to other PKI needs, especially to issue certificates having a short life or "short-live".

The strong level of security provided by a SIM essentially guarantees a trusted chain. Further note that although the examples shown generally provide the use of a virtual SIM or applet, the same concepts can also be applied to a physical SIM card having similar capabilities.

In some embodiments as a short live period for the certificates, there is no real need to provide a revocation mechanism as the certificates will expire in a short period.

Also, remote administration of the SIM as PCA (applet) could eventually revoke, or replace the "Communication intermediate CA certificate" used to issue new "end-entity" certificates. In other words, the service can be suspended if required through remote administration of the SIM.

Related to an anonymization use-case of the embodiments, usually the end-to-end secure channel is established between a client and a server based on mutual authentication. From the perspective of the server, it is a matter of checking if the client that is trying to connect is allowed. From the client perspective, it is a matter of verifying if the targeted server is the expected one in order to avoid a man in the middle attack. A certificate usually represents the device identity. Both server and client should first trust each other by checking their certificate chain. The problem is that during this process called the TLS handshake, both client and server exchange their certificates in the clear and subject to exposure or tracking. In other words, it is possible to track the device activity each time a connection is established using the conventional TLS handshake method. Obviously, it is not possible to access data exchanged as soon as the encryption is enabled, but it remains possible to track. In the typical TLS handshake method, encryption is enabled at end of the TLS handshake process during the step called "Server finished".

Figure 7:
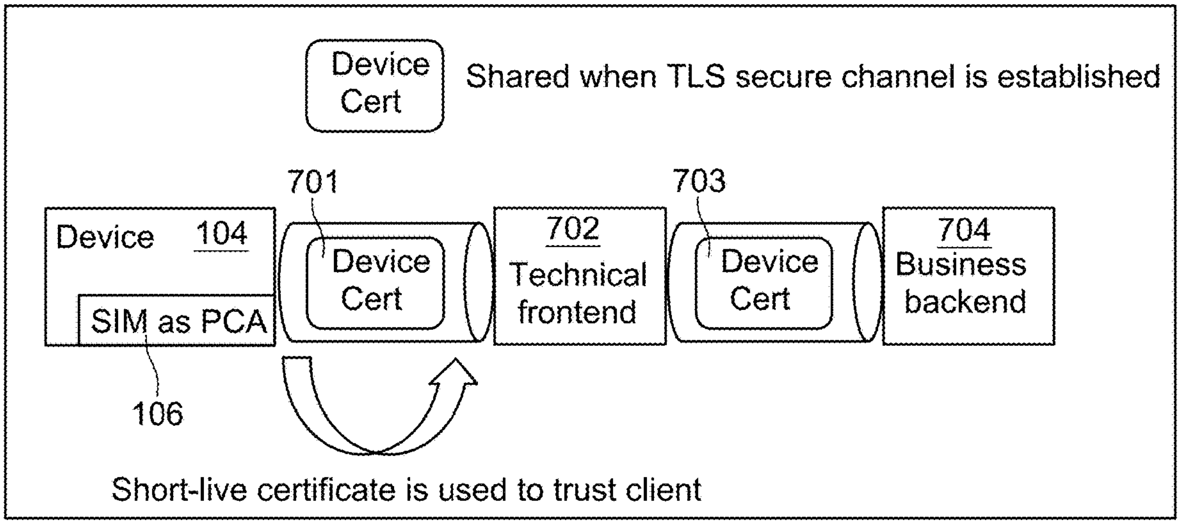
FIG. 7 illustrates a system of using short-live certificates in an environment separating a transmission stream into a technical frontend and a business logic backend while preserving anonymization, privacy, and scalability in accordance with the embodiments.

The solution provided herein as illustrated in the system 700 of FIG. 7 comprises separating the server part in charge of the transport (herein referred to as the technical frontend 702) from the portion in charge of the data treatment (hereinafter referred to as the business logic backend 704). The short live certificates 701, 703, etc. promoted in the embodiments are used to connect to the technical frontend 702. The device certificates 703 representing the device identity are used by the business logic backend 704 while the communication certificates 701 are use by the technical front end 702.

Thus, for the technical frontend 702 point of view, the identity of the client remains unknown. However, the technical frontend knows that it is a valid client, since the presented "short-live" certificate is valid and trusted. As soon as the secure channel is established, the device identity (device certificate) could be exchanged in confidential way ensuring the privacy and anonymization.

At the end of the process in accordance with the embodiments, the level of security is improved since the process is still a mutual authentication with in additional anonymization of the client (meaning more privacy).

In the absence of any specific clarification related to its express use in a particular context, where the terms "substantial" or "about" or "usually" in any grammatical form are used as modifiers in the present disclosure and any appended claims (e.g., to modify a structure, a dimension, a measurement, or some other characteristic), it is understood that the characteristic may vary by up to 30 percent.

The terms "include" and "comprise" as well as derivatives thereof, in all of their syntactic contexts, are to be construed without limitation in an open, inclusive sense, (e.g., "including, but not limited to"). The term "or," is inclusive, meaning and/or. The phrases "associated with" and "associated therewith," as well as derivatives thereof, can be understood as meaning to include, be included within, interconnect with, contain, be contained within, connect to or with, couple to or with, be communicable with, cooperate with, interleave, juxtapose, be proximate to, be bound to or with, have, have a property of, or the like.

Unless the context requires otherwise, throughout the specification and claims which follow, the word "comprise" and variations thereof, such as, "comprises" and "comprising," are to be construed in an open, inclusive sense, e.g., "including, but not limited to."

Reference throughout this specification to "one embodiment" or "an embodiment" or "some embodiments" and variations thereof mean that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content and context clearly dictates otherwise. It should also be noted that the conjunctive terms, "and" and "or" are generally employed in the broadest sense to include "and/or" unless the content and context clearly dictates inclusivity or exclusivity as the case may be. In addition, the composition of "and" and "or" when recited herein as "and/or" is intended to encompass an embodiment that includes all of the associated items or ideas and one or more other alternative embodiments that include fewer than all of the associated items or idea.

In the present disclosure, conjunctive lists make use of a comma, which may be known as an Oxford comma, a Harvard comma, a serial comma, or another like term. Such lists are intended to connect words, clauses or sentences such that the thing following the comma is also included in the list.

As the context may require in this disclosure, except as the context may dictate otherwise, the singular shall mean the plural and vice versa. All pronouns shall mean and include the person, entity, firm or corporation to which they relate. Also, the masculine shall mean the feminine and vice versa.

When so arranged as described herein, each computing device or processor may be transformed from a generic and unspecific computing device or processor to a combination device comprising hardware and software configured for a specific and particular purpose providing more than conventional functions and solving a particular technical problem with a particular technical solution. When so arranged as described herein, to the extent that any of the inventive concepts described herein are found by a body of competent adjudication to be subsumed in an abstract idea, the ordered combination of elements and limitations are expressly presented to provide a requisite inventive concept by transforming the abstract idea into a tangible and concrete practical application of that abstract idea.

The headings and Abstract of the Disclosure provided herein are for convenience only and do not limit or interpret the scope or meaning of the embodiments. The various embodiments described above can be combined to provide further embodiments. Aspects of the embodiments can be modified, if necessary to employ concepts of the various patents, application and publications to provide further embodiments.

The invention claimed is:

1. A method of using a subscriber identity module (SIM) as a pseudonym certificate authority (PCA) to anonymize and mitigate the tracking of a device having the SIM, comprising:

one or more processors and memory coupled to the one or more processor, wherein the memory includes computer instructions which when executed by the one or more processors causes the one or more processors to perform the operations of:

validating a device identity presented by the device, wherein the SIM serves as a Registration Authority; and issuing a new certificate in response to a certificate sign request (CSR) submitted by the device, wherein the SIM serves as a Certificate Authority (CA), wherein SIM is provisioned securely with a copy of a device root CA certificate to validate a certificate chain of the device identity and a communication CA certificate to issue a new communication end-entity device certificate stored in the device or in the SIM, wherein the one or more processors further perform device authentication by performing the operations of:

retrieving by the device a current time from a trusted time source;

submitting by the device the new communication end-entity device certificate and the current time to the SIM;

validating by the SIM a chain using the copy of the device root CA certificate;

validating by the SIM the dates related to the copy of the device root CA certificate using the current time;

generating by the SIM a secure random challenge and storing it in the SIM with the current time;

encrypting by the SIM the secure random challenge using a public key for the communication CA certificate forming an encrypted challenge;

sending by the SIM to the device the encrypted challenge; and decrypting by the device the encrypted challenge using a private key for the device root CA certificate providing an decrypted challenge;

storing by the device the decrypted challenge.

2. The method of claim 1, wherein the SIM is an applet stored within the device.

3. The method of claim 1, wherein the SIM is an applet, the communication CA certificate has a public key, and the device root CA certificate has a private key, and wherein the private key is stored in the applet in a secure manner as part of the device provisioning.

4. The method of claim 1, wherein the one or more processors further perform the certificate sign request (CSR) by performing the operations of:

generating by the device a public/private key pair which will be associated to the communication CA certificate;

building by the device the CSR including a challenge password;

generating a private key by the device to sign the CSR;

submitting by the device the CSR to the SIM;

retrieving by the SIM, the password and the time;

checking by the SIM the challenge password;

verifying by the SIM, a CSR signature using the public key;

checking rules by the SIM and generating by the SIM validity dates from a current time; and issuing by the SIM a new certificate if all rules are checked and passed.

5. The method of claim 1, wherein the SIM acts as the PCA to generate short-live end-entity certificates dedicated to sign broadcast messages.

6. The method of claim 1, wherein the method separates a server portion responsible for transport serving as a technical frontend from a server portion responsible for data treatment serving as a business logic backend and wherein the device as a client remains unknown to the technical frontend while still knowing that the device is a valid client.

7. The method of claim 1, wherein the method provides authentication between IoT devices in a scalable manner using PKI infrastructure using short-live certificates.

8. A system of authenticating a communication device by issuance of a certificate, comprising:

a subscriber identity module (SIM) in a form of an applet securely linked to the device and used as a pseudonym certificate authority (PCA);

wherein the SIM is configured to:

validate a device identity presented by the device, wherein the SIM serves as a Registration Authority; and issue a new certificate in response to a certificate sign request (CSR) submitted by the communication device, wherein the SIM serves as a Certificate Authority (CA), wherein SIM is provisioned securely with a copy of a device root CA certificate to validate a certificate chain of the device identity and a communication CA certificate to issue a new communication end-entity device certificate stored in the device or in the SIM, wherein one or more processors of the SIM and communication device further perform device authentication by performing the operations of:

retrieving by the communication device a current time from a trusted time source;

submitting by the communication device the new communication end-entity device certificate and the current time to the SIM;

validating by the SIM a chain using the copy of the device root CA certificate;

validating by the SIM the dates related to the copy of the device root CA certificate using the current time;

generating by the SIM a secure random challenge and storing it in the SIM with the current time;

encrypting by the SIM the secure random challenge using a public key for the communication CA certificate forming an encrypted challenge;

sending by the SIM to the device the encrypted challenge; and decrypting by the device the encrypted challenge using a private key for the device root CA certificate providing an decrypted challenge;

storing by the device the decrypted challenge.

9. The system of claim 8, wherein the one or more processors further perform the certificate sign request (CSR) by performing the operations of:

generating by the communication device a public/private key pair which will be associated to the communication CA certificate;

building by the communication device the CSR including a challenge password;

generating a private key by the communication device to sign the CSR;

submitting by the communication device the CSR to the SIM;

retrieving by the SIM, the password and the time;

checking by the SIM the challenge password;

verifying by the SIM, a CSR signature using the public key;

checking rules by the SIM and generating by the SIM validity dates from a current time; and issuing by the SIM a new certificate if all rules are checked and passed, wherein the new certificate is a short-live certificate.

10. A system of authenticating a device by issuance of a certificate, comprising:

a subscriber identity module (SIM) in a form of an applet securely linked to the device and used as a pseudonym certificate authority (PCA);

a copy of a device root CA certificate used to validate a certificate chain of the device identity provisioned securely in the SIM;

a communication CA certificate used to issue a new communication end entity device certificate stored in the device or in the SIM;

wherein the SIM is configured to:

validate a device identity presented by the communication device, wherein the SIM serves as a Registration Authority by:

receiving the new communication end-entity device certificate and the current time to the SIM validating by the SIM a chain using the copy of the device root CA certificate;

validating by the SIM the dates related to the copy of the device root CA certificate using the current time;

generating by the SIM a secure random challenge and storing it in the SIM with the current time;

encrypting by the SIM the secure random challenge using a public key for the communication CA certificate forming an encrypted challenge; and sending by the SIM to the device the encrypted challenge for decryption and storage by the device of a decrypted challenge; and issue a new certificate in response to a certificate sign request (CSR) submitted by the device, wherein the SIM serves as a Certificate Authority (CA), wherein the system performs in response to the CSR, the operations of:

generating by the device a public/private key pair which will be associated to the communication CA certificate;

building by the device the CSR including a challenge password;

generating a private key by the device to sign the CSR;

submitting by the device the CSR to the SIM;

retrieving by the SIM, the password and the time;

checking by the SIM the challenge password;

verifying by the SIM, a CSR signature using the public key;

checking rules by the SIM and generating by the SIM validity dates from a current time; and issuing by the SIM a new certificate if all rules are checked and passed.

* * * * *